United States Patent

Unland et al.

[11] Patent Number: 6,161,523
[45] Date of Patent: Dec. 19, 2000

[54] METHOD FOR DETERMINING THE ADVANCE IGNITION ANGLE INTERNAL COMBUSTION ENGINES IGNITION SYSTEMS

[75] Inventors: Stefan Unland, Vaihingen-Kleinglattbach; Oskar Torno, Schwieberdingen, both of Germany; Robert Sloboda, Yokohama, Japan; Werner Haeming, Neudenau, Germany; Iwan Surjadi, Vaihingen, Germany; Michael Baeuerle, Markgroeningen, Germany; Steffen Franke, Schwieberdingen, Germany

[73] Assignee: Robert Bosch GmbH, Stuttgart, Germany

[21] Appl. No.: 09/308,208
[22] PCT Filed: Aug. 4, 1998
[86] PCT No.: PCT/DE98/02240
    § 371 Date: Aug. 20, 1999
    § 102(e) Date: Aug. 20, 1999
[87] PCT Pub. No.: WO99/14488
    PCT Pub. Date: Mar. 25, 1999

[30] Foreign Application Priority Data

Sep. 13, 1997 [DE] Germany .......................... 197 40 365

[51] Int. Cl.$^7$ ..................................................... F02P 5/00
[52] U.S. Cl. ................. 123/406.23; 123/406.35
[58] Field of Search .................. 123/406.29, 406.34, 123/406.35, 406.23

[56] References Cited

U.S. PATENT DOCUMENTS

| | | |
|---|---|---|
| 4,268,910 | 5/1981 | Omori et al. . |
| 4,535,739 | 8/1985 | Kudo et al. ........................ 123/406.35 |
| 4,971,007 | 11/1990 | Gopp et al. ........................ 123/406.37 |
| 5,165,378 | 11/1992 | Miyashita ............................... 123/425 |
| 5,411,000 | 5/1995 | Miyashita et al. . |
| 5,645,034 | 7/1997 | Entenmann et al. . |
| 5,992,385 | 11/1999 | Hess et al. ........................ 123/406.23 |

Primary Examiner—Erick Solis
Attorney, Agent, or Firm—Kenyon & Kenyon

[57] ABSTRACT

A method for determining the ignition point in ignition systems for internal combustion engines, having integrated knock control, a basic ignition point being determined on the basis of measured operating parameters using a stored characteristic map. The knock control, after engine knock has occurred, determines a knock control ignition point, which is more retarded than the basic ignition point, the knock control ignition point, in response to knock-free combustions, being altered step-by-step so as to be more advanced. Furthermore, a torque interface is integrated, which on the basis of the operating parameters and/or the demands placed by the driver, determines a torque-optimized ignition point, and the knock control ignition point being the most advanced permissible ignition point which is issued by the control unit.

6 Claims, 2 Drawing Sheets

METHOD FOR DETERMINING THE ADVANCE IGNITION ANGLE INTERNAL COMBUSTION ENGINES IGNITION SYSTEMS

FIELD OF THE INVENTION

The present invention relates to a method for determining the controlled variables of cyclically repeating processes in internal combustion engines.

BACKGROUND INFORMATION

From the Bosch combined ignition and fuel injection system Motronik (1987722011, KH/VDT-09.85-DE), control units having an integrated method for determining the ignition control variables are known. In this context, the control unit, between two ignition processes, determines the controlled variables such as dwell angle and ignition angle or ignition point from information such as load and engine speed, temperature setting and throttle valve setting. In this context, the controlled variables are determined by stored characteristic maps, the characteristic maps, for determining the ignition point, being calculated on the basis of experiments on an engine test stand. In the motor vehicle, this characteristic map is then optimized according to the specifiable criteria such as fuel usage, exhaust gas and driving performance, and is then stored. On the basis of the current operating parameters, the ignition point is then derived from the characteristic maps and can be adjusted to various operating conditions. For example, during idling, the ignition can be set at favorable exhaust gas values, perfectly smooth running, and minimum fuel usage, whereas in a partial load running, the vehicle performance and the fuel economy are in the foreground. Adjusting the ignition point individually to each operating condition of the engine makes it possible to take account, to a high degree, of the specific demands placed on the engine. In this context, it is possible to adjust the ignition point specifically to the actual demands on the torque of the internal combustion engine through linking up with a torque interface. Furthermore, it is known to integrate, in the ignition control, a knock control which advances the ignition point after the occurrence of knocking and then, when the knocking has ceased, returns step-by-step to the map-controlled ignition point. Thus the knocking operation of the internal combustion engine is avoided, which significantly increases the life expectancy of the internal combustion engine.

SUMMARY OF THE INVENTION

The method of the present invention for determining the ignition point in ignition systems for internal combustion engines having integrated knock control has the advantage that in determining the ignition point the advantages of optimizing the ignition point in accordance with the setpoint torque can be combined with the knock control. In this context, the ignition timing advance and the adaptation of the knock control are blocked if the ignition point is reduced by the torque interface, since, in this case, the ignition point issued has been determined not by the knock control but by the torque interface. Since this ignition point, issued by the torque interface, is more retarded than the ignition point of the knock control, in this case the ignition timing advance of the knock control is advantageously frozen. Thus, even in the case of integrated knock control and torque optimization of the ignition point, the most knock-free operation possible of the internal combustion engine is assured.

In this way, the most retarded possible ignition point can be advantageously derived from a characteristic map on the basis of the operating parameters. In this context, the most retarded possible ignition point can be established in the characteristic map in a way specific to the application, or it can be determined as a function of the system.

DETAILED DESCRIPTION

Figure 1:
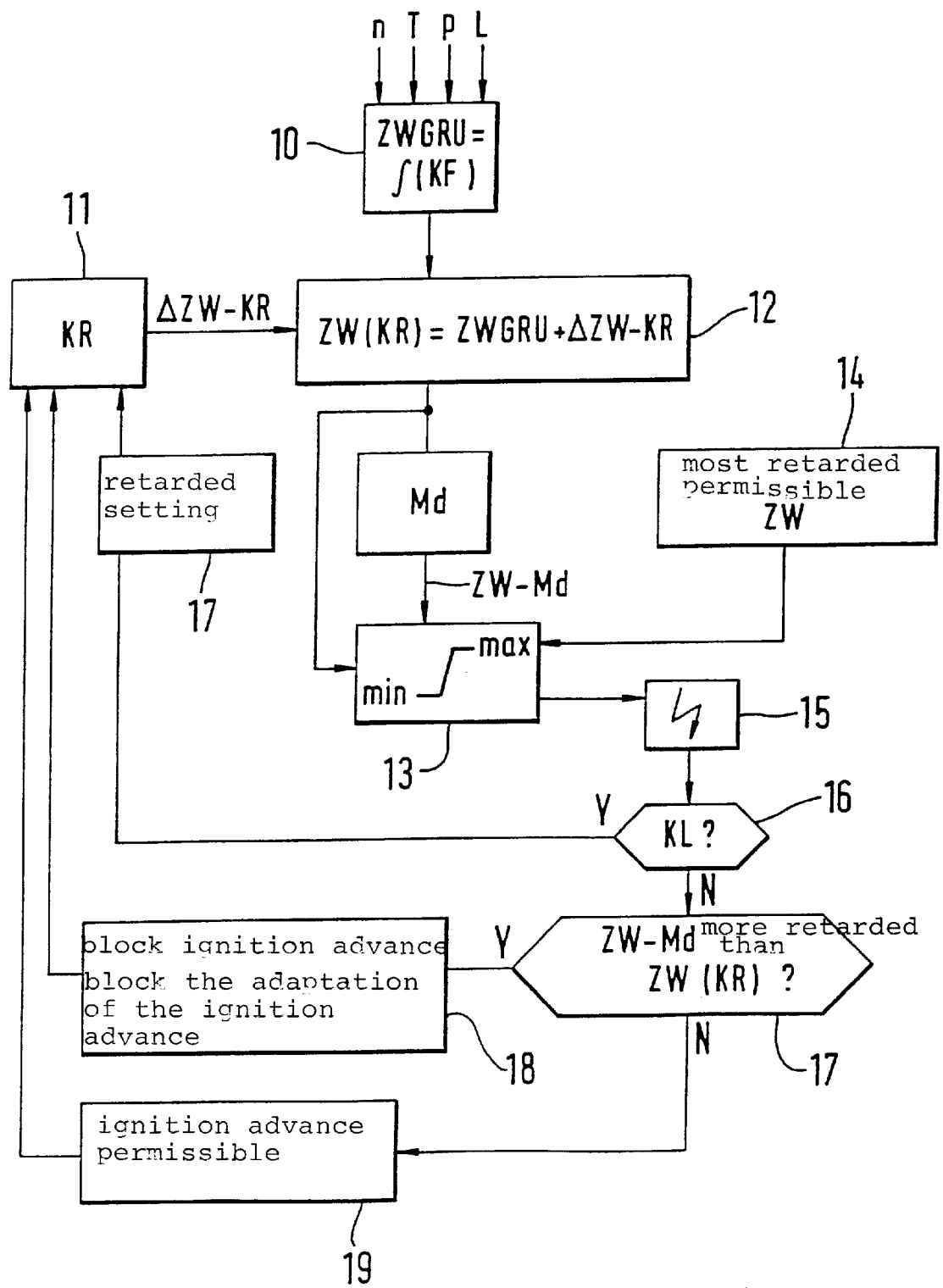
FIG. 1 shows a program flowchart individual process steps for carrying out the method according to the present invention.

FIG. 1 shows the individual process steps of the torque-optimized knock control of the present invention, the knock control being implemented in accordance with individual cylinders and the basic ignition point ZWGRU being determined in a first process step 10 on the basis of operating parameters such as engine speed n, temperature T, and pressure p, using a stored characteristic map KF, so that the basic ignition point ZWGRU is a function of characteristic map KF. In one working step 11, depicting knock control KR, in response to detecting a knock KL after a triggered combustion, a correction value ΔZW-KR is determined, which then, in working step 12, is added to basic ignition point ZWGRU, thus yielding knock control ignition point ZW(KR)=ZWGRU+ΔZW-KR. This additive correction of the basic ignition point in the knock control retards the ignition point, thus pulling it away from the knock limit.

This knock control ignition point ZW(KR) is now conveyed, on the one hand, via a torque interface MD to a limiting stage 13 and, on the other hand, directly to limiting stage 13. The torque interface represents one branch, which determines a torque-optimized ignition point ZW-MD irrespective of whether knocking has begun or not, on the basis of the current operation conditions and the demands posed by the driver, for example, a maximum load. Torque-optimized ignition point ZW-MD is conveyed to limiting stage 13, just as is the ignition point from knock control ZW(KR). This limiting stage 13 limits the ignition point for the next combustion within a permissible band, the most retarded permissible ignition point $Zw_{ret}$, determined in a working step 14, being also conveyed to limiting stage 13. This most retarded permissible ignition point $Zw_{ret}$, in this context, is yielded, for example, by the specifiable exhaust gas temperature limit. Furthermore, this most retarded permissible ignition point $Zw_{ret}$ can be derived from a further characteristic map on the basis of the current operating parameters. The most advanced permissible ignition point is the torque-optimized ignition point ZW-Md, which is determined by the torque interface. Thus the most advanced permissible ignition point and the most retarded permissible ignition point are available to limiting stage 13, so that the ignition point to be issued is within this band.

Subsequently, in working step 15, the ignition point determined in this manner is issued and then in a query 16 is checked, as to whether in the triggered combustion an engine knock KL has occurred. If this is the case, then the yes-output leads to working step 17, which conveys the necessity of retarding the ignition point to knock control 11, which then, as was already described above, determines a corresponding correction value for the next combustion in this cylinder. If no knocking has occurred, the no-output of query 16 leads to a query 17. In query 17, it is checked as to whether the torque-optimized ignition point is more retarded than the ignition point of knock control ZW(KR).

If this is the case, i.e., torque interface Md has reduced the torque and has retarded the torque-optimized ignition point further than was requested by the knock control, then the yes-output of query 17 leads to working step 18, which blocks the ignition advance of knock control ignition point ZW(KR), the blocking resulting from a step-by-step reduction of correction value ΔZW-KR. This means that the momentary correction value ΔZW-KR is retained, which, at the same time, amounts to blocking the ignition advance of the adaptation. If it has been determined in query 17 that torque-optimized ignition point ZW-Md is more advanced than the ignition point of knock control ZW(KR), then the no-output of query 17 is conveyed to working step 19, and a step-by-step return of the knock control ignition point is permitted in the direction of the characteristic map ignition point.

Figure 2:
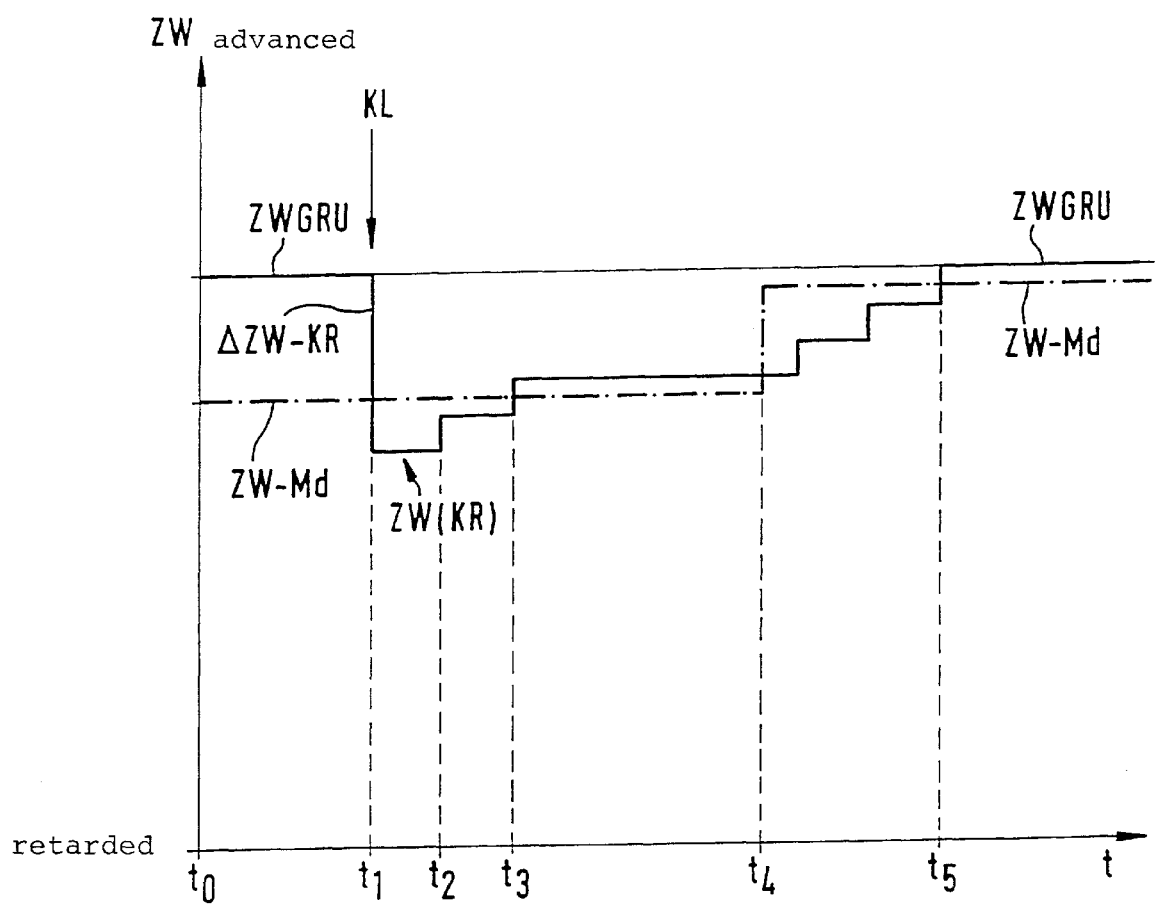
FIG. 2 shows, in an ignition point-time diagram, the relationships of the various ignition points to each other.

In FIG. 2, the various ignition points are depicted over time. At time to, basic ignition point ZWGRU and torque-optimized ignition point ZW-Md are determined in the control unit. Since by time $t_0$ no engine knock KL had yet occurred, the basic ignition point has not yet been corrected by a correction value of the knock control, or expressed differently, ΔZW-KR=0. In accordance with the request that the torque-optimized ignition point be within the limiting band of the most advanced and most retarded permissible ignition points, in time period $t_0 \rightarrow t_1$, torque-optimized ignition point ZW-Md is issued as the ignition point to the corresponding cylinder. At time $t_1$, an engine knock KL begins in the cylinder, the basic ignition point being thus additively corrected by a correction value ZW-KR that is set by the knock control. Since knock control ignition point ZW(KR), determined in this manner, is more retarded than torque-optimized ignition point ZW-Md, this knock control ignition point is first issued beginning at time $t_1$. After the ignition point has been retarded in this way, the ignition point, after a specifiable number of knock-free combustions by time $t_2$, is changed step-by-step so as to be more advanced, towards the basic ignition point. This occurs in that correction value ΔZW-KR, which is determined after the engine knock, is reduced step-by-step. By time $t_3$, knock control ignition point ZW(KR) is more advanced, with respect to the above dead center OT, than torque-optimized ignition point ZW-Md, so that beginning at time $t_3$, torque-optimized ignition point ZW-Md is again issued. The ignition advance of the knock control ignition point is blocked, which means correction value ΔZW-KR is not reduced anymore as long as torque-optimized ignition point ZW-Md is more retarded than the knock control ignition point. By time $t_4$, for example, a change in the demands placed on the internal combustion engine has occurred, and a new torque-optimized ignition point ΔZW-KR is determined, which is more advanced in relation to the previous torque-optimized ignition point ΔZW-KR, and is even more advanced than knock control ignition point ZW(KR), because this knock control ignition point ZW(KR) is issued and at the same time the ignition advance is continued. By time $t_5$, the relationship of the torque-optimized ignition point to the knock control ignition point has reversed once again, so that the ignition advance is blocked once again and the torque-optimized ignition point is issued.

The evaluation as to whether the issued ignition point of the torque interface is more retarded or more advanced than the ignition point value of knock control ZW(KR), has the consequence that it is possible to generate a very precise estimate as to whether the existing knock has arisen despite the knock control or because of the torque optimization. Thus an even better engagement with the torque behavior is possible while at the same time preventing engine knock in the internal combustion engine.

It should be stated, in principle, that the knock control ignition point is issued, and only when the torque-optimized ignition point is more retarded than the ignition point determined in the knock control path is this torque-optimized ignition point issued.

What is claimed is:

1. A method for determining an ignition point in an ignition system of an internal combustion engine, the internal combustion engine including an integrated knock control arrangement, the method comprising the steps of:

(a) determining a basic ignition point as a function of measured operating parameters using a stored characteristic map;

(b) after an engine knock is detected, determining a knock control ignition point using the knock control arrangement, the knock control ignition point being more retarded than the basic ignition point;

(c) changing the knock control ignition point in a stepped manner so as to be further advanced in response to a knock-free combustion;

(d) determining a torque-optimized ignition point as a function of at least one of the operating parameters and a driver-generated demand using an integrated torque interface, the knock control ignition point being a most advanced permissible ignition point which is generated by the knock control arrangement; and (e) if the torque-optimized ignition point is more retarded than the knock control ignition point, blocking an ignition advance of the knock control ignition point after the knock-free combustion.

2. The method according to claim 1, further comprising the step of:

(f) if the torque-optimized ignition point is more retarded than the knock control ignition point, issuing the torque-optimized ignition point.

3. The method according to claim 1, further comprising the step of:

(g) comparing the knock control ignition point with the torque-optimized ignition point.

4. The method according to claim 3, wherein step (b) further includes the substeps of:

determining a correction value using the knock control arrangement; and generating the knock control ignition point by adding the correction value to the basic ignition point.

5. The method according to claim 4, wherein step (b) further includes the substep of:

reducing the correction value in a stepped manner to advance the knock control ignition point.

6. The method according to claim 5, wherein step (b) further includes the substep of:

maintaining the correction value while the torque-optimized ignition point is more retarded than the knock control ignition point.

* * * * *